US008911074B2

(12) United States Patent
Ohta

(10) Patent No.: US 8,911,074 B2
(45) Date of Patent: Dec. 16, 2014

(54) INK JET RECORDING METHOD

(71) Applicant: Seiko Epson Corporation, Tokyo (JP)

(72) Inventor: Hitoshi Ohta, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/066,030

(22) Filed: Oct. 29, 2013

(65) Prior Publication Data

US 2014/0132684 A1 May 15, 2014

(30) Foreign Application Priority Data

Nov. 9, 2012 (JP) ................................ 2012-247058

(51) Int. Cl.

*G01D 11/00* (2006.01)
*B41J 2/01* (2006.01)
*B41M 7/00* (2006.01)
*B41J 11/00* (2006.01)
*B41M 3/00* (2006.01)
*B41M 5/00* (2006.01)

(52) U.S. Cl.

CPC ............ *B41J 11/0015* (2013.01); *B41M 7/009* (2013.01); *B41M 5/0064* (2013.01); *B41M 5/0047* (2013.01); *B41M 3/008* (2013.01); *B41M 5/0023* (2013.01)

USPC .......................................... 347/102; 347/100

(58) Field of Classification Search

USPC .................. 347/95, 98, 100, 102; 428/195.1; 523/160

See application file for complete search history.

(56) References Cited

U.S. PATENT DOCUMENTS

| | | | |
|---|---|---|---|
| 4,880,465 A | 11/1989 | Loria et al. | |
| 8,398,199 B2 * | 3/2013 | Verdonck | 347/15 |
| 8,777,391 B2 * | 7/2014 | Okada et al. | 347/100 |
| 2005/0235870 A1 | 10/2005 | Ishihara | |
| 2010/0086690 A1 | 4/2010 | Aoki | |
| 2011/0184108 A1 | 7/2011 | Okuda et al. | |
| 2012/0156449 A1 | 6/2012 | Tateishi et al. | |

FOREIGN PATENT DOCUMENTS

| | | |
|---|---|---|
| EP | 2 053 099 A1 | 4/2009 |
| JP | 09-031242 | 2/1997 |
| JP | 2001-039006 A | 2/2001 |
| JP | 2005-146165 A | 6/2005 |

(Continued)

OTHER PUBLICATIONS

Extended European Search Report for Application No. EP 13 18 5575 dated Feb. 25, 2014 (9 pages).

*Primary Examiner* — Anh T. N. Vo

(74) *Attorney, Agent, or Firm* — Harness, Dickey & Pierce, P.L.C.

(57) ABSTRACT

An ink jet recording method includes recording a white color-based image by discharging droplets of a white color-based ink composition from nozzles of an ink jet recording head, and then attaching the droplets of the white color-based ink composition on a recording surface of a flexible packing film, recording a color by discharging droplets of a color ink composition from the nozzles, and then attaching the droplets of the color ink composition on the white color-based image, and firstly heating at least the white color-based image and the color image at temperature higher than 40° C., in which the white color-based ink composition contains water, a coloring material of a white color base, and a urethane-based resin, but substantially does not contain alkyl polyols having a normal boiling point of 280° C. or more, and the color ink composition contains water, and a coloring material of a color system.

10 Claims, 1 Drawing Sheet

(56) References Cited

FOREIGN PATENT DOCUMENTS

| | | | |
|---|---|---|---|
| JP | 2007-277380 | | 10/2007 |
| JP | 2007-314734 | A | 12/2007 |
| JP | 2008-115218 | A | 5/2008 |
| JP | 2012-046587 | A | 3/2012 |
| WO | WO-2011-02784 | A1 | 3/2011 |

* cited by examiner

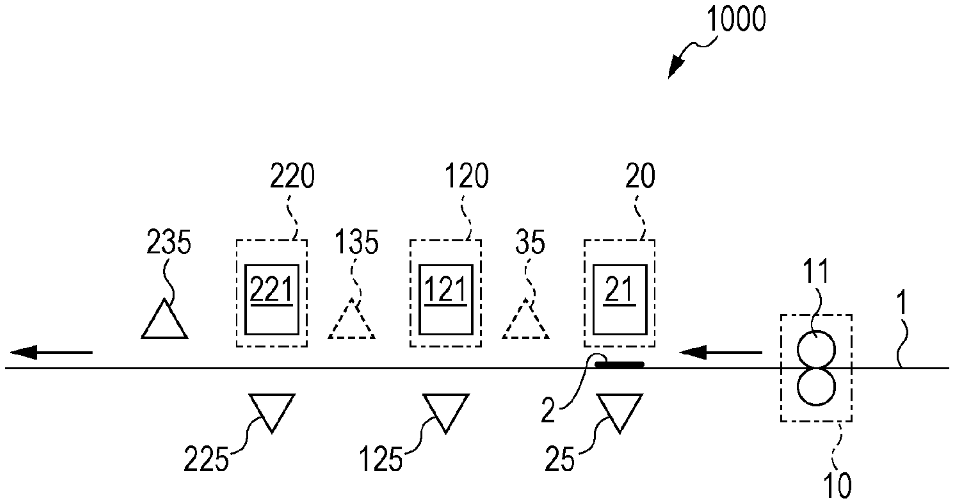
1000
220
120
20
235
221
135
121
35
21
11
1
2
225
125
25
10

INK JET RECORDING METHOD

Priority is claimed under 35 U.S.C. §119 to Japanese Application No. 2012-247058 filed on Nov. 9, 2012, is hereby incorporated by reference in its entirety.

BACKGROUND

1. Technical Field

The present invention relates to an ink jet recording method.

2. Related Art

In recent years, a so-called ink jet recording method which records images and characters by fine ink droplets discharged from nozzles of an ink jet recording head has been used in various fields. The aforementioned ink jet recording method is also used in printing with respect to a recording medium (for example, plastic film or the like) with low ink absorbability or without ink absorbability. For example, JP-A-2007-277380 describes that by using an energy ray-curable ink including water, a photopolymerizable compound, a photopolymerization initiator and the like, printing with respect to the recording medium with ink non-absorbability is performed. Since such an energy ray-curable ink is cured by irradiation of energy rays, the energy ray-curable ink can be fixed on the recording medium with ink non-absorbability such as a plastic film, also.

Then, a flexible packing film is widely used for packing foods or the like. The flexible packing film is used for displaying product names and the like of products to be packed, and has a recording surface (formed of, for example, plastic materials such as polyolefin, nylon, polyester, and the like) on which images are printed. Gravure printing is commonly used for printing with respect to the recording surface of the flexible packing film, and a gravure ink which is used in the gravure printing is obtained by dispersing or dissolving components such as pigments and resins in organic solvents (refer to JP-A-2012-46587).

However, since the gravure ink described in the above JP-A-2012-46587 has organic solvents as a main solvent, there is a case where a special exhaust equipment is necessary, or a problem of environmental load occurs.

Instead of using the gravure printing which uses the gravure ink, applying the ink jet recording method which uses the energy ray-curable ink described in JP-A-2007-277380 to the printing method (recording method) on the flexible packing film to solve such a problem is being considered.

However, since the energy ray-curable ink uses the photopolymerizable compound and the photopolymerization initiator, there is a case that it may not be the case that the effect on the reduction of environmental load is sufficient. Furthermore, since the mechanism for irradiating light is necessary to cure the energy ray-curable ink, problems such as the increase in size of an ink jet recording apparatus and the increase of power consumption, the complexification of light irradiation control and the like have occurred.

Particularly, since the flexible packing film is widely used in packing foods, reducing the consumption of components such as organic solvents, photopolymerizable compounds, photopolymerization initiators and the like to minimize the effect on human body is demanded.

A water-based ink for an ink jet recording of which a main solvent is water is being developed to solve the problems described above, however, images obtained by recording the water-based ink in the related art on the flexible packing film do not have sufficient abrasion resistance and sufficient peeling resistance yet.

SUMMARY

An advantage of some aspects of the invention is to provide an ink jet recording method which may record images with excellent abrasion resistance and excellent peeling resistance.

The invention can be realized in the following forms or application examples.

Application Example 1

According to an aspect of the invention, there is provided an ink jet recording method including: recording a white color-based image by discharging droplets of a white color-based ink composition from nozzles of an ink jet recording head, and then attaching the droplets of the white color-based ink composition on a recording surface of a flexible packing film; recording a color by discharging droplets of a color ink composition from the nozzles, and then attaching the droplets of the color ink composition on the white color-based image; and firstly heating at least the white color-based image and the color image at temperature higher than 40° C., in which the white color-based ink composition contains water, a coloring material of a white color base, and a urethane-based resin, but substantially does not contain alkyl polyols having a normal boiling point of 280° C. or more, and the color ink composition contains water, and a coloring material of a color system.

In accordance with the ink jet recording method of Application Example 1, an image, which has excellent abrasion resistance and excellent peeling resistance with respect to the flexible packing film, may be recorded. Moreover, "image" in an aspect of the invention indicates a printing pattern formed from a dot group and includes text printing and solid printing.

Application Example 2

In the ink jet recording method according to Application Example 1, the color ink composition may include at least any one of a urethane-based resin and an acryl-based resin.

Application Example 3

In the ink jet recording method according to Application Example 1 or 2, coating the color image with a coating film formed of a resin ink composition, and secondly heating the coating film at temperature equal to or higher than 40° C. before firstly heating may be further included. Firstly heating is performed after secondly heating, and heats the white color-based image, the color image, and the coating film at temperature higher than 40° C. The resin ink composition contains resin, but substantially does not contain the coloring material. The glass-transition temperature of the resin which is included in the resin ink composition may be higher than the glass-transition temperature of a urethane-based resin which is included in the white color-based ink composition.

Application Example 4

In the ink jet recording method according to any one of Application Examples 1 to 3, the glass-transition temperature of the urethane-based resin which is included in the white color-based ink composition may be 10° C. to 70° C.

Application Example 5

In the ink jet recording method according to Application Example 4, the white color-based ink composition may also contain a wax. The melting point of the wax which is included in the white color-based ink composition may be higher than the heating temperature in firstly heating.

Application Example 6

In the ink jet recording method according to any one of Application Examples 1 to 5, in a case where the mass right after the recording of the white color-based image is set to 100%, and the mass at the time when drying of the white color-based image ends is set to 0%, recording the color image may be performed when the mass is in the range of 30% to 80% by drying of the white color-based image.

Application Example 7

In the ink jet recording method according to any one of Application Examples 1 to 6, the white color-based ink composition may contain a polyoxy ethylene alkyl ether-based surfactant.

Application Example 8

In the ink jet recording method according to any one of Application Examples 1 to 7, before recording the color image, thirdly heating the white color-based image in the range of 40° C. to 80° C. may be further included. The heating temperature in firstly heating may be higher than the heating temperature in thirdly heating. And the heating time in firstly heating may be longer than the heating time in thirdly heating.

Application Example 9

In the ink jet recording method according to any one of Application Examples 1 to 8, a film thickness of the flexible packing film may be in the range of 5 μm to 70 μm.

Application Example 10

In the ink jet recording method according to any one of Application Examples 1 to 9, at least one of an anti-fogging agent and an antistatic agent may be present on the recording surface of the flexible packing film.

BRIEF DESCRIPTION OF THE DRAWING

The invention will be described with reference to the accompanying drawing, wherein like numbers reference like elements.

FIGURE is a schematic diagram showing an example of an ink jet recording apparatus in an ink jet recording method according to an embodiment.

DESCRIPTION OF EXEMPLARY EMBODIMENTS

The preferable embodiments of the invention will be described below. The embodiments which will be described below are intended to illustrate an example of the invention. In addition, the invention is not limited to the following embodiments, and various modifications that are within the gist of the invention are included.

1. Ink Jet Recording Method

An ink jet recording method according to an embodiment of the invention is characterized by a white color-based image recording step which records a white color-based image by discharging droplets of a white color-based ink composition from nozzles of an ink jet recording head, and then attaching the droplets of the white color-based ink composition on a recording surface of a flexible packing film, a color image recording step which records the color image by discharging droplets of a color ink composition from the nozzles, and then attaching the droplets of the color ink composition on a white color-based image, and a first heating step which heats at least the white color-based image and the color image at temperature higher than 40° C. are included, in which the white color-based ink composition contains water, a coloring material of a white color base, and a urethane-based resin, substantially not containing alkyl polyols having the normal boiling point of 280° C. or more, and the color ink composition contains water and a coloring material of the color system.

Hereinafter, each step in the ink jet recording method according to the embodiment will be described in detail.

1.1. White Color-based Image Recording Step

The ink jet recording method according to the embodiment includes the white color-based image recording step. The white color-based image recording step is a step in which by discharging droplets of the white color-based ink composition (described below) from the nozzles of the ink jet recording head, and by attaching the droplets of the white color-based ink composition on the recording surface of the flexible packing film, the white color-based image is recorded.

1.2. White Color-based Image Heating Step

The ink jet recording method according to the embodiment may include the white color-based image heating step in which the white color-based image is heated to temperature in the range of 40° C. to 80° C., before the color image recording step described below. Thus, it is possible to promote drying and filming of the white color-based image. The white color-based image heating step corresponds to the third heating step in aspects.

The heating temperature in the white color-based image heating step is 40° C. to 80° C., and is preferably 60° C. to 80° C. By setting the heating temperature of the white color-based image heating step to be in the above-ranges, it is possible to suppress distortion and contraction of the flexible packing film, and it is possible for part of volatile components in the white color-based image to be evaporated and scattered efficiently.

The white color-based image heating step, when used in the heating of the white color-based image on the recording surface of the flexible packing film, may be a step which heats droplets during flying (during discharging) of the droplets of the white color-based ink composition. That is, the white color-based image heating step may be performed successively, before forming, during forming, and/or after forming the white color-based image.

Moreover, the heating temperature according to an aspect of the invention refers to the surface temperature of the recording surface of the flexible packing film. A measuring method for surface temperature is not particularly limited, but, thermography using thermography apparatus H2640/H2630 (NEC Avio Infrared Technologies Co., Ltd.) may be used, for example.

1.3. Color Image Recording Step

The ink jet recording method according to the embodiment includes the color image recording step. The color image recording step is a step in which by discharging droplets of the color ink composition from the nozzles, and by attaching the droplets of the color ink composition on the white color-based image, the color image is recorded. In the above described manner, the color image is formed on at least a portion of the white color-based image.

Since the color image is formed on the recording surface of the flexible packing film via the white color-based image, the abrasion resistance and the peeling resistance are excellent compared to those in a case where the image is formed on the flexible packing film directly.

In a case where the mass right after recording of the white color-based image (that is, the total mass of the white color-based ink composition discharged at the time of the white color-based image recording step) is set to 100%, and the mass of the time when drying of the white color-based image ends is set to 0%, the color image recording step is preferably performed when the mass is in the range of 30% to 80% by drying of the white color-based image. Furthermore, it is more preferably performed when the mass is set to be in the range of 35% to 75%. When the mass after the drying of the white color-based image is in the above-ranges, particularly in not less than the lower limit, it is possible to suppress the mixing of the white color-based image and the color image, and thus a clear color image may be obtained. When the mass after drying of the white color-based image is in the above-range, particularly in not more than the upper limit, it is possible to maintain the adhesion between the white color-based image and the flexible packing film, and thus the adhesion between the white color-based image and the color image may be improved. Furthermore, in a case where the color ink composition includes a resin different from that in the white ink composition, thermal contraction and the like of the resin which is included in each ink are different, and thus peeling-off is likely to occur more notably than at the interface between the white color-based image and the color image. In such a case, by performing recording at the dried state described above, the mixing of ink compositions at the interface between two images occurs, and even when both ink compositions partly contain different resin, it is possible to suppress defects of peeling-off and the like. Moreover, in order to set the mass of the white color-based image in the above-range, a natural drying may be sufficient, but in accordance with the white color-based image heating step described above, it is possible to improve the recording speed.

1.4. Color Image Heating Step

The ink jet recording method according to the embodiment may, further, include a color image heating step in which the color image is heated. Thus, it is possible to promote drying and filming of the color image. The color image heating step may be performed successively after the white color-based image heating step, before forming the color image, and during forming the color image.

From the viewpoint of promoting drying of the color image, and of suppressing the distortion of flexible packing film, the heating temperature of the color image heating step is preferably 40° C. or more, is more preferably 40° C. to 80° C., and is even more preferably 40° C. to 60° C.

1.5. Coating Step

The ink jet recording method according to the embodiment may, further, include a coating step. The coating step is a step in which the color image is coated with coating film formed of the resin ink composition. Since coating the color image with coating film may suppress the generation of peeling and abrasion of the color image and the white color-based image, it is possible to improve the abrasion resistance and the peeling resistance of the image which is recorded on the flexible packing film.

The coating film may coat at least the upper surface of the color image, and may continuously coat the side surface from the upper surface of the color image, further, may continuously coat to the upper surface of the white color-based image on which the color image is not recorded. In the manner, when the coating film forms a coating film which continuously coats to the upper surface of the color image, the side surface of the color image, and the upper surface of the white color-based image on which the color image is not coated, the fixity of the coating film is further improved. This is preferable since the abrasion resistance and the peeling resistance of the color image and the white color-based image are further improved.

In a case where the sum of the mass right after recording of the white color-based image (that is, the total mass of the white color-based ink composition discharged at the time of the white color-based image recording step) and the mass right after recording of the color image (that is, the total mass of the color ink composition discharged at the time of the color image recording step) is set to 100%, and the mass at the time when drying of the white color-based image and the color image ends is set to 0%, the coating step is preferably performed in the mass range of 30% to 80% after drying of the color image. Maintaining the mass in the mass range of 35% to 75% is more preferable since the color mixing with the coating film in the coating step and the adhesion may become in an excellent state. Furthermore, in a case where the resin ink composition includes a resin different from that in the color ink composition, since thermal contraction and the like of the resin which is included in each ink are different, peeling-off is likely to occur more notably at the interface between the color image and the coating film. In such a case, by performing recording in the dried state described above, mixing of the ink compositions to each other at the interface between the color image and the coating film occurs, and even when both the ink compositions partly contain different resin, it is possible to suppress the defects of peeling-off and the like. Moreover, in order to set the mass of the color image in the above-range, a natural drying may be sufficient, but in accordance with the image heating described above, it is possible to improve the recording speed.

1.6. Coating Film Heating Step

The ink jet recording method according to the embodiment may include the coating film heating step in which the coating film is heated to temperature of 40° C. or higher before an entire heating step described below. Thus, it is possible to promote drying and filming of the coating film. The coating film heating step corresponds to a second heating step in aspects.

The heating temperature in the coating film heating step is usually 40° C. or higher, and is preferably 40° C. to 60° C. Thus, it is possible to suppress distortion and contraction of the flexible packing film, and part of volatile components in the coating film to be evaporated and scattered efficiently.

By continuously performing the coating film heating before forming the coating film, during forming the coating film and/or after forming of the coating film, it is possible to remove at least part of volatile components which is included in the coating film.

In particular, since the color mixing with the coating film on the color image and the adhesion, may become in an excellent state, by performing the coating film heating step before forming the coating film and/or during forming, performing the coating film heating step before forming the coating film and/or during forming is preferable.

In addition, in a case where a recording medium is continuously heated from before printing start to printing end, from the start of heating to the recording medium to after the end of the white color-based image recording is the third heating step (white color-based image heating step), from after the end of the white color-based image recording to after the end of the color image recording is the color image heating step, and from after the end of the color image recording to the coating step corresponds to the coating film heating step (the second heating step).

1.7. Entire Heating Step

The ink jet recording method according to the embodiment includes the entire heating step which heats at least the white color-based image and the color image is heated to temperature higher than 40° C. In a case where the coating step and the coating film heating step described above are performed by the ink jet recording method according to the embodiment, the entire heating step is a step in which, in addition to the white color-based image and the color image, the coating film is heated as well. The entire heating step corresponds to the first heating step in aspects.

The heating temperature in the entire heating step is higher than 40° C., is preferably higher than 40° C. to 80° C., and is more preferably 60° C. to 80° C. When the heating temperature in the entire heating step is higher than 40° C., filming and/or drying of the white color-based image, the color ink image which are recorded on the flexible packing film, and the coating film may be promoted. In addition, when the temperature is 80° C. or lower, the distortion of the flexible packing film may be suppressed.

Furthermore, the heating temperature of the entire heating step is preferably higher than the heating temperature in the white color-based image heating step. By setting the heating temperature of the entire heating step to be higher than the heating temperature of the white color-based image heating step, it is possible to increase drying property of the white color-based image, the color ink image, and the coating film. In addition, from the same viewpoint, the heating temperature in the entire heating step is preferably higher than the heating temperature in the color image heating step and the coating film heating step.

Furthermore, from the viewpoint of sufficient drying of the white color-based image, the color ink image which are recorded on the flexible packing film and the coating film to the inside portion, the heating time in the entire heating step is preferably longer than heating time in the white color-based image heating step. In addition, from the same viewpoint, the heating time in the entire heating step is preferably longer than that of the color image heating step and the coating film heating step.

1.8. Other Steps

The ink jet recording method according to the embodiment may further include a hydrophilicity treating step. Since, when the hydrophilicity treating step is performed, the adhesion of the image which is recorded is improved, there is a case where the abrasion resistance and the peeling resistance of the image which is recorded may be improved.

The hydrophilicity treating step, may be performed with respect to the recording surface of the flexible packing film before the white color-based image recording step (a), may be performed with respect to the white color-based image before the color image recording step after the white color-based image recording step (b), and may be performed with respect to the color image before the coating step after the color image recording step (c).

A hydrophilic treatment, for example, may be performed using a well-known corona discharge treatment apparatus and a plasma discharge treatment apparatus.

2. Ink Jet Recording Apparatus

Next, an example of an ink jet recording apparatus which may be suitably used in the ink jet recording method described above will be exemplified. Moreover, the ink jet recording apparatus which may be used in the ink jet recording method according to the invention is not limited to the following aspects.

FIGURE is a schematic diagram showing an example of the ink jet recording apparatus used in the ink jet recording method according to the embodiment.

A ink jet recording apparatus 1000 which is an example of the embodiment is configured to have a transporting unit 10 which transports a flexible packing film 1, a white color-based image recording unit 20 which records the white color-based image using the white color-based ink composition, a white color-based image heating unit 25 which is provided at the position facing the white color-based image recording unit, color image recording unit 120 which records the color image on the white color-based image using the color ink composition, the color image heating unit 125 which is provided at the position facing the color image recording unit, a coating unit 220 which forms a coating film which coats the color image using the resin ink composition, a coating film heating unit 225 which is provided at the position facing the coating unit, and an entire heating unit 235 which heats the white color-based image, the color image, and the coating film. The white color-based image heating unit, the color image heating unit may be, if necessary, provided with a white color-based image heating unit 35 which is employed at the downstream side of a white color-based image heating unit 25, and a color image heating unit 135 which is employed at the downstream side of the color image heating unit 125.

2.1. Transporting Unit

The transporting unit 10, for example, may be configured from a roller 11. The transporting unit 10 may have a plurality of the roller 11. In the example illustrated, the transporting unit 10, in the direction to which the flexible packing film 1 is transported (indicated by arrows in the FIGURE), is provided at the upstream side of the white color-based image recording unit 20, however, it is not limited thereto. As long as a recording medium 1 may be transported, the position provided and the number of position are arbitrary. The transporting unit 10 may be provided with a paper feeding roll, a paper feeding tray, a paper output roll, a paper output tray, various types of platen and the like.

The flexible packing film 1 which is transported by the transporting unit 10 is transported to the position where the white color-based image is recorded on the recording surface by the white color-based image recording unit 20.

Moreover, FIGURE illustrates a case in which the flexible packing film 1 is a roll paper. However, even when the flexible packing film 1 is a single sheet, it is possible to perform the transportation of the flexible packing film by suitably configuring the transporting unit 10.

2.2. White Color-based Image Recording Unit

The white color-based image recording unit 20 records a white color-based image 2 using the white color-based ink composition with respect to the recording surface of the flexible packing film 1. The white color-based image recording unit 20 is provided with an ink jet recording head 21 which has nozzles which discharge the white color-based ink composition. The white color-based image recording unit 20 is one example of unit in order to perform the white color-based image recording step described above.

As a method in which the ink such as the white color-based ink composition is discharged from the nozzles of the ink jet recording head, for example, the followings are exemplified. Specifically, examples of the methods include a method in which a strong electric field between the nozzles and accelerating electrode placed in front of the nozzles is applied, the ink composition in liquid droplet shape from the nozzle is continuously discharged, and during flying between the deflecting electrodes of the liquid droplets of the ink composition, by sending recording information signal to the deflecting electrodes, or discharging according to the recording information signal without deflecting the liquid droplets of the ink composition, recording is performed (electrostatic attraction method); a method in which by applying pressure to the ink composition using a small pump, and mechanically vibrating the nozzles using quartz oscillator or the like, the liquid droplets of the ink composition are forcibly discharged; a method in which pressure and the recording information signal are applied to the ink composition by piezoelectric element at the same time, the liquid droplets of the ink composition are discharged, and thus recording is performed (piezo method); a method in which the ink composition is heated and foamed in accordance with the recording information signal by the micro-electrode, the ink composition droplets are discharged, and thus recording is performed (thermal jet method); and the like.

2.3. White Color-based Image Heating Unit

The white color-based image heating unit heats the white color-based image 2. In the example of FIGURE, the white color-based image heating unit 25 is employed at the position facing the white color-based image recording unit 20. The white color-based image heating unit 25, as long as the configuration in which evaporation and scattering of the liquid medium which is present in the white color-based ink composition is promoted is provided, is not particularly limited. The white color-based image heating unit 25 is one example of a unit in order to perform the white color-based image heating step described above. In addition, as illustrated in FIGURE, if necessary, the white color-based image heating unit 35 may be provided at the downstream side of the white color-based image heating unit 25.

Specific examples of the white color-based image heating unit 25, and the white color-based image heating unit 35 include a unit in which a platen heater is provided below (the opposite side of the flexible packing film 1 when viewed from the transporting surface) the transporting surface of the flexible packing film 1, and heats the flexible packing film 1 from the opposite side to the recording surface; a unit in which a heating chamber or a thermostatic oven in which the flexible packing film 1 is immersed during transportation is provided, and heats the flexible packing film 1 from various directions; a unit in which a heater is provided above the transporting surface of the flexible packing film 1, and heats the flexible packing film 1 from the side of the recording surface; and the like. Furthermore, the heater including the platen heater, the heating chamber, and the type of the thermostatic oven are not limited, however, forced air heating, radiation heating, conduction heating, high-frequency drying, microwave drying, and the like may be used, for example.

2.4. Color Image Recording Unit

The color image recording unit 120 records the color image (not shown in FIGURE) using the color ink composition on the white color-based image 2. The color image recording unit 120 is one example of a unit in order to perform the color image recording step described above.

When the color image recording unit 120 is placed such that the color image may be recorded on the white color-based image 2 which is recorded by the white color-based image recording unit 20, the placed position is not limited, however, for example, it may be placed at the downstream side of the white color-based image recording unit 20.

The color image recording unit 120 is provided with an ink jet recording head 121 which has the nozzles which discharges the color ink composition. The method for discharging the color ink composition from the nozzles of the ink jet recording head 121 is the same as that in the example described in the white color-based image recording unit 20, and then, the description thereof will not be repeated.

2.5. Color Image Heating Unit

The color image heating unit heats the color image (not shown). In the example of FIGURE, the color image heating unit 125 is employed at the position facing the color image recording unit 120. The color image heating unit 125 is one example of a unit in order to perform the color image heating step described above.

When the color image heating unit 125 is placed to be performed after heating the white color-based image 2 by the white color-based image heating unit 25 (if necessary, the white color-based image heating unit 35 is also added), the placed position is not limited, however, it may be placed at the downstream side of the white color-based image heating unit, for example.

Furthermore, as illustrated in FIGURE, if necessary, the color image heating unit 135 may be provided at the downstream side of the color image heating unit 125.

As the heating unit used in the color image heating unit 125 and the color image heating unit 135, the heating unit may be one described in the white color-based image heating unit 25 and the white color-based image heating unit 35.

2.6. Coating Unit 220

The coating unit 220 forms the coating film (not shown) which coats the color image using the resin ink composition. The coating unit 220 is one example of a unit in order to perform the coating step described above.

In the example of FIGURE, the coating unit 220 is provided with an ink jet recording head 221 which has nozzles which discharge the resin ink composition. The method for discharging the resin ink composition from the nozzles of an ink jet recording head 131 is the same as that in the example described in the white color-based image recording unit 20. Thus, the description thereof will not be repeated.

When the coating unit 220 is placed such that the color image is coated with the coating film, the placed position is not particularly limited, however, it may be placed at the downstream side of the color image recording unit 120, for example. Furthermore, the coating unit 220 may also be combined with the color image recording unit 120. For example, the nozzles for discharging the color ink composition, and the nozzles for discharging the resin ink composition may be mounted on one ink jet recording head.

2.7. Coating Film Heating Unit

A coating film heating unit 225 heats the coating film (not shown). The coating film heating unit 225 is one example of a unit in order to perform the coating film heating step described above.

When the coating film heating unit 225 is placed to be performed after heating the color image (not shown) by the color image heating unit 125 (if necessary, the color image heating unit 135 is also added), the placed position is not limited, however, it may be placed at the downstream side of the color image heating unit, for example.

The heating unit used in the coating film heating unit 225 may be one described in the white color-based image heating unit 25 and the white color-based image heating unit 35.

From the viewpoint of reducing the used amount of the resin ink composition, a case in which the coating unit 220 adopts the ink jet printing system is shown in the ink jet recording apparatus 1000 according to the embodiment. However, it is not limited to the case described above. A coating method which uses a roll coater or the like may be adopted.

2.8. Entire Heating Unit

The entire heating unit 235 heats the white color-based image, the color image, the coating film. The entire heating unit 235 is one example of a unit in order to perform the entire heating step described above.

When the entire heating unit 235 is placed such that the white color-based image, the color image, and the coating film may be heated, the placed position is not limited. It may be placed at the downstream side of the coating unit 220 as in the example in FIGURE.

As the heating unit used in the entire heating unit 235, one described in the white color-based image heating unit 25 and the white color-based image heating unit 35 may be used.

2.9. Others

The ink jet recording apparatus 1000 according to the embodiment may further include a hydrophilic treatment unit. The hydrophilic treatment unit, for example, is configured from a well-known corona discharge treatment apparatus or a plasma discharge treatment apparatus.

3. Ink Composition

The white color-based ink composition, and the color ink composition are used in the ink jet recording method according to the embodiment. Hereinafter, the components which are included in each ink composition according to the embodiment will be described in detail.

3.1. White Color-based Ink Composition

The white color-based ink composition which is used in the ink jet recording method according to the embodiment contains a coloring material of the white color base, a urethane-based resin and water.

"The white color-based ink composition" means an ink which may record a color referred to as "white" in common sense, and the white color-based ink composition may also contain one which is colored with trace amount. Furthermore, the ink which contains the pigment includes an ink which is called "white ink" or the like, and commercially available. Additionally, for example, when ink is recorded on Epson genuine photo paper <gloss> (manufactured by Seiko Epson Corporation) by 100% duty or more, or by quantity with which a surface of photo paper is sufficiently coated, in a case where lightness of the ink ($L^*$) and chromaticity ($a^*$, $b^*$) were measured using spectrophotometer Spectrolino (trade name, manufactured by GretagMacbeth Co.) by setting as measurement condition: D50 light source, observation field of view: 2°, concentration: DIN NB, white reference: Abs, filter: No, measurement mode: Reflectance, the inks having the range of $70 \leq L^* \leq 100$, $-4.5 \leq a^* \leq 2$, $-6 \leq b^* \leq 2.5$ are included.

3.1.1. Coloring Material of the White Color Base

Examples of the coloring material of the white color base include metal oxides, barium sulfate, calcium carbonate, and the like. Examples of the metal oxides include titanium dioxide, zinc oxide, silica, alumina, magnesium oxide, and the like. In addition, the coloring material of the white color base includes particles having a hollow structure. The particles having a hollow structure are not particularly limited, and a well-known one in the related art may be used. The particles described in the specification of U.S. Pat. No. 4,880,465 may be preferably used as the particles having the hollow structure. From the viewpoint of pure whiteness and wear resistance, titanium dioxide is preferable as the coloring material of the white color base which is contained in the white color-based ink composition of the embodiment.

The content of the coloring material of the white color base (solid content) is preferably 1% by mass to 20% by mass, and is more preferably 5% by mass to 15% by mass, with respect to the total mass of the white color-based ink composition. When the content of the coloring material of the white color base is in the above range, particularly, in not more than the upper limit, there is a case where the discharge stability of the nozzles of the ink jet recording apparatus becomes excellent. Furthermore, when the content of the coloring material of the white color base is in the above range, particularly, in not less than the lower limit, there is a tendency that an excellent image having high color density such as the degree of pure whiteness may be obtained.

The average particle diameter of the coloring material of the white color base on the basis of volume (hereinafter, refer to as "average particle diameter") is preferably 30 nm to 600 nm, and is more preferably 200 nm to 400 nm. When the average particle diameter of the coloring material of the white color base is in the above range, and particularly, is not more than the upper limit, there is a case where dispersion stability of particles which form the coloring material of the white color base becomes excellent, and the discharge stability of the nozzles of the ink jet recording apparatus becomes excellent. In addition, when the average particle diameter of the coloring material of the white color base is in the above range, and particularly, in not less than the lower limit, there is a tendency that pure whiteness becomes high.

The average particle diameter of the coloring material of the white color base may be measured by particle size distribution measuring apparatus which uses a laser diffraction scattering method as measurement principle. Example of the particle size distribution measuring apparatus includes a particle size distribution analyzer (for example, "Microtrac UPA" manufactured by Nikkiso Co., Ltd.) which uses dynamic light scattering method as measurement principle.

3.1.2. Urethane-based Resin

The urethane-based resin improves the fixity of the white color-based ink composition with respect to the flexible packing film, and can make the abrasion resistance and the peeling resistance of the white color-based image which is recorded on the flexible packing film excellent. The mechanism in detail is not clear, but it is considered that the following reason becomes one factor.

That is, in many cases, an anti-fogging agent and an antistatic agent are present on the recording surface of the flexible packing film. The anti-fogging agent and the antistatic agent have a fat-soluble surfactant (will be described later) as a main component, and in many cases, are formed of low molecules with high polarity. Therefore, when a styrene-acrylic resin which has been used in a water-based ink in the related art is used, since the anti-fogging agent and the antistatic agent become peeling-off layer of ink, the fixity of an image is decreased. In contrast, since the urethane-based resin has many polar groups compared to the styrene-acrylic resin, it is considered that, by dissolving the anti-fogging agent and the antistatic agent together, an image may be firmly fixed on the recording surface of the flexible packing film.

The urethane-based resin is a polymer which is synthesized by the reaction of polyisocyanate and polyol. The synthesis of the urethane-based resin may be performed using well-known methods in the related art.

Examples of the polyisocyanate include: a linear aliphatic isocyanate such as tetramethylene diisocyanate, 1,6-hexamethylene diisocyanate, dodecamethylene diisocyanate, trimethyl hexamethylene diisocyanate, lysine diisocyanate, and the like; an aliphatic isocyanate having a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, 3,3'-dimethyl-4,4'-dicyclohexylmethane diisocyanate; aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, tetramethyl xylylene diisocyanate, and the like. When synthesizing the urethane-based resin, the above-described polyisocyanate may be solely used, or two or more kinds thereof may be used in combination.

Examples of polyol include polyether polyol and polycarbonate polyol and the like. Examples of polyether polyol include polyethylene glycol, polypropylene glycol, polytetramethylene glycol, and the like. Examples of polycarbonate polyol include diols such as 1,3-propanediol, 1,4-butanediol, 1,6-hexanediol, diethylene glycol, polyethylene glycol, polypropylene glycol, or polytetramethylene glycol, and the like and phosgene, dialkyl carbonates such as dimethyl carbonate, and the like or the reaction products of ethylene carbonate, and the like with cyclic carbonates.

As the urethane-based resin which is included in the white color-based ink composition according to the embodiment, the emulsion type in which the above described urethane-based resin is dispersed as in powder shape is preferably used.

As the urethane-based resin of an emulsion type, commercially available products may be used. Examples of the urethane-based resin of the emulsion type include Superflex 130,740 (trade name, manufactured by DAI-ICHI KOGYO SEIYAKU CO., LTD.), RESAMINE D-1060, D-2020, D-4080, D-4200, D-6300, D-6455 (trade name, manufactured by Dainichiseika Color & Chemicals Mfg. Co. Ltd.), Takelac W-5030, E-6021, W-6061, W-6110, WS-5000 (trade name, manufactured by Mitsui Chemicals, Inc.), WBR-016U, WBR-601U, WBR-2018, WBR-022U (trade name, Taisei Fine Chemical Co., Ltd.), UW-1100-E, UW-1200-E, UW-1300-E, UW-2050-E, UW-3100-E, UW-2000, UW-2050, UW-3100, UW-3200 (trade name, manufactured by Ube Industries, Ltd.), and the like.

The glass-transition temperature Tg of the urethane-based resin is preferably 10° C. to 70° C., is more preferably 10° C. to 60° C., and is even more preferably 15° C. to 60° C. When Tg of the urethane-based resin is in the above-range, and particularly in not less than the lower limit, while imparting a moderate flexibility to coating of the white color-based image, it is possible to improve the abrasion resistance of the white color-based image. In addition, when Tg of the urethane-based resin is in the above-range, and particularly in not more than the upper limit, since coating of the white color-based image may be firm, while suppressing the embrittlement of the film, it is possible to improve the peeling resistance of the white color-based image.

The content of the urethane-based resin is preferably 0.1% by mass to 30% by mass, is more preferably 0.5% by mass to 20% by mass, and is particularly preferably 1% by mass to 15% by mass in terms of solid content, with respect to the entire ink composition. When the content of the urethane-based resin is in the above range, particularly, in not less than the lower limit, it is possible to further improve the abrasion resistance and the peeling resistance of the white color-based image. Furthermore, when the content of the urethane-based resin is in the above-range, particularly in not more than the upper limit, there is a tendency that the preservation stability and the discharge stability of the white color-based ink composition become excellent.

3.1.3. Water

Water is a main medium of the white color-based ink composition, and a component which is evaporated and scattered by drying. Water is preferably pure water such as ion-exchanged water, ultrafiltration water, reverse osmosis water, and distilled water, or a water in which ionic impurity is removed as much as possible, such as ultrapure water. Furthermore, in a case where a pigment dispersion and the ink composition formed of the pigment dispersion are stored for a long time, the generation of mold and bacteria can be prevented, and therefore using water which is sterilized by UV irradiation or addition of hydrogen peroxide is preferable.

The white color-based ink composition according to the embodiment is, so called, the water-based ink which includes water as a main solvent (water is contained as much as 50% by mass or more). The water-based ink has advantages that odor may be suppressed. Also, it is good for the environment since the water makes up 50% by mass or more of the composition.

3.1.4. Other Components

The white color-based ink composition according to the embodiment may, further, contains wax, surfactant, alkyl polyols, glycol ethers, pyrrolidones, a pH adjusting agent, a preservative and fungicide, an anti-corrosion agent, a chelating agent, and the like. When the white color-based ink composition according to the embodiment contains the compound thereof, there is a case where the characteristics is further improved.

Wax

Wax imparts lubricity and gloss to the surface of the recorded image. Thus, the generation of peeling-off, and friction and the like of images may be suppressed.

In a case where wax is contained in the white color-based ink composition according to the embodiment, the use of wax with a higher melting point than the heating temperature in the entire heating step described above is preferable. In the above-described manner, since the wax remains without melting out, it is possible to suppress the decrease of characteristics of the wax, and then the abrasion resistance and the peeling resistance of the white color-based image become excellent.

Examples of the components which configure the wax include plant and animal waxes such as carnauba wax, can deli wax, beeswax, rice wax, lanolin; petroleum-base waxes such as paraffin wax, microcrystalline wax, polyethylene wax, oxidized polyethylene wax, petrolatum; mineral-based waxes such as montan wax, ozokerite; synthetic waxes such as carbon wax, Hoechst wax, polyolefin wax, stearic acid amide, natural-synthetic wax emulsion and blended wax such as $\alpha$-olefin-maleic anhydride copolymer. The waxes may be singly used, or may be used as a mixture of two or more kinds. Among them, from the viewpoint of excellence by an effect which enhances the fixity with respect to the recording surface which includes polyolefin, the use of polyolefin waxes (in particular, polyethylene wax, and polypropylene wax), and paraffin wax is preferable.

Commercially available waxes may be also used as it is. Examples of the waxes include Nopukoto PEM-17 (trade name, manufactured by San Nopco Co., Ltd.), CHEMIPEARL W4005 (trade name, manufactured by Mitsui Chemicals, Inc.), and AQUACER515, 539, 593 (all are trade names, manufactured by BYK Japan KK) and the like.

The content of the wax is preferably 0.1% by mass to 5% by mass in terms of solid content, with respect to the total mass of the white color-based ink composition. When the content of the wax is in the above range, the function of the above wax may be exhibited excellently.

Surfactant

A surfactant has a function that uniformly wets and distributes the ink composition on the recording medium (flexible packing film). As the surfactant, nonionic surfactants are preferable. Among nonionic surfactants, silicone-based surfactants, acetylene glycol-base surfactants, polyoxy ethylene alkyl ether-based surfactants are more preferable.

As the silicone-based surfactants, polysiloxane-based compounds are preferably used, and polyether-modified organosiloxane, and the like are exemplified. More specifically, BYK-306, BYK-307, BYK-333, BYK-341, BYK-345, BYK-346, BYK-347, BYK-348 (all are trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (all are trade names, manufactured by Shin-Etsu Chemical Co., Ltd.) and the like are exemplified.

In a case where the silicone-based surfactants are used, the content is preferably 0.1% by mass to 5% by mass with respect to the total amount of the white color-based ink composition.

The acetylene glycol-based surfactant is excellent in surface tension and has an ability to suitably retain surface tension, and has a characteristic which does not nearly have foaming property. Thus, since the ink composition which contains acetylene the glycol-based surfactant may suitably retain surface tension and interfacial tension between the ink composition of a head nozzle surface and a printer member which contacts thereto, and when the surfactant is applied to the ink jet recording method, it is possible to significantly enhance the discharge stability. As acetylene glycol-based surfactant, for example, SURFYNOL 104, 104 E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all are trade names, manufactured by Air Products and Chemicals Inc), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, AE-3 (all are trade names, manufactured by Nissin Chemical Industry Co., Ltd.), acetylenol E00, E00P, E40, E100 (all are trade names, manufactured by Kawaken Fine Chemical Co., Ltd.) are exemplified.

In a case where the acetylene glycol-based surfactant is used, the content is preferably 0.1% by mass to 5% by mass with respect to the total amount of the white color-based ink composition.

The polyoxyethylene alkyl ether-based surfactant is excellent, in particular, in ability to be arrayed on the interface of the ink composition according to an aspect of the invention in comparison to other nonionic surfactants. Accordingly, the surfactant is arrayed on the surface of a dispersion component which is used in the ink composition such as the pigment or the resin emulsion according to an aspect of the invention, and is present at the interface between each component, and thus the dispersion stability to a liquid component of the dispersion component is improved. Furthermore, since the surfactant is highly likely to be arrayed at interface between the ink composition and air, the white color-based ink composition which contains polyoxy ethylene alkyl ether-based surfactant, in the portion at which the ink composition of the head nozzles and the like contacts with air, suppresses a rapid drying of the ink composition, and action which suppresses nozzle clogging and the like is excellent. Therefore, in a case where the surfactant is applied to the ink jet recording method, it is possible to significantly enhance the discharge stability. As polyoxyethylene alkyl ether-based surfactant, emulsion 103, 104P, 105, 106, 108, 109P, 120, 123P, 130K, 147, 150, 210P, 220, 306P, 320P, 350, 404, 408, 409PV, 420, 430, 705, 707, 709, 1108, 1118S-70, 1135S-70, 1150S-60, 4085, 2020G-HA, 2025G (all are trade names, manufactured by Kao Corporation) and the like may be used.

In a case where the polyoxy ethylene alkyl ether-based surfactant is used, the content is preferably 0.1% by mass to 5% by mass, is more preferably 0.5% by mass to 2% by mass, and is particularly preferably 0.5% by mass to 1.5% by mass with respect to the total mass of the white color-based ink composition. When the content of polyoxyethylene alkyl ether-based surfactant is in the above-range, particularly in not less than the lower limit, it is possible to make the discharge stability of the ink composition excellent. Furthermore, when the content of polyoxyethylene alkyl ether-based surfactant is in the above-range, particularly in not more than the upper limit, it is possible to suppress the decrease of water resistance of an image which is recorded, and obtain an image which has an excellent water-friction resistance.

Alkyl Polyols

The white color-based ink composition according to the embodiment may contain alkyl polyols of which the normal boiling point is 180° C. to 230° C. When containing alkyl polyols of which the boiling point is in the above-range, there is a case where the suppression of the wet-spreading property, and the drying property of the white color-based ink composition is easier. Thus, it is possible to record an image with excellent fixity and excellent image quality with respect to the flexible packing film, and reduce clogging of nozzles, which is preferable.

The alkyl polyols of which the normal boiling point is 180° C. to 230° C., 188° C. to 230° C. are preferable. When the normal boiling point of alkyl polyols is in the above-range, particularly in not less than the lower limit, moisture-retaining property of the white color-based ink composition is excellent, the suppression of clogging of nozzles is easy, which is preferable. When the normal boiling point of the alkyl polyols is in the above-range, particularly in not more than the upper limit, without greatly decreasing the drying property of the white color-based ink composition, the suppression of the shade unevenness of an image, and the decrease of the fixity of an image are possible, which is preferable.

Examples of alkyl polyols of which the normal boiling point is 180° C. to 230° C. include propylene glycol [188° C.], dipropylene glycol [230° C.], 1,2-butanediol [194° C.], 1,2-pentanediol [210° C.], 1,2-hexanediol [224° C.], 1,2-heptane diol [227° C.], 3-methyl-1,3-butanediol [203° C.], 2-ethyl-2-methyl-1,3-propanediol [226° C.], 2-methyl-1,3-propanediol [214° C.], 2-methyl-2-propyl-1,3-propanediol [230° C.], 2,2-dimethyl-1,3-propanediol [210° C.], 2-methyl pentan-2,4-diol [197° C.]. Moreover, the number in parenthesis indicates the normal boiling point.

The alkyl polyols of which the normal boiling point is 180° C. to 230° C. may be solely used, or a mixture of two or more may be used.

From the viewpoint of the effect which improves the wet-spreading property of the flexible packing film to decrease the shade unevenness, and securing the preservation stability and the discharge reliability of the white color-based ink composition, the content of the alkyl polyols is preferably in the range of 8% by mass to 25% by mass with respect to the total mass of the white color-based ink composition. When the content of the alkyl polyols is in the above-range, particularly in not less than the lower limit, the preservation stability of the white color-based ink composition and the moisture-retaining property of the white color-based ink composition become excellent, and it is possible to decrease the generation of clogging of the nozzles, which is preferable. In addition, when the content of the alkyl polyols is in the above-range, particularly in not more than the upper limit, without greatly decreasing the drying property of the white color-based ink composition, an image in which the generation of the shade unevenness is small and which has excellent fixity is obtained, which is preferable.

The white color-based ink composition according to the embodiment substantially does not contain alkyl polyols of which the normal boiling point is 280° C. or more. When including the alkyl polyols of which the normal boiling point is 280° C. or more, the drying property of the white color-based ink composition is greatly decreased. As a result, when performing a recording with respect to the flexible packing film, it is because there is a case where not only the shade unevenness of the image is outstanding, but also the fixity of the image is decreased. As the alkyl polyols of which the normal boiling point is 280° C. or more, glycerine (the normal boiling point is 290° C.) is exemplified.

Moreover, in an aspect of the invention, "substantially does not contain A" means that A is not intentionally added when manufacturing the ink, and trace amount of A which is inevitably mixed or generated during manufacturing the ink or storing the ink may be included. As specific examples of "substantially does not contain A", for example, 1.0% by mass or more is not contained, preferably 0.5% by mass or more is not contained, more preferably 0.1% by mass or more is not contained, even more preferably 0.05% by mass or more is not contained, and particularly preferably 0.01% by mass or more is not contained.

Glycol Ethers

Specific examples of the glycol ether include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol isobutyl heptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethyl-pentyl ether, ethylene glycol mono-2-ethylpentyl ether, ethylene glycol mono-2-methyl-pentyl ether, diethylene glycol mono-2-methyl-pentyl ether, propylene glycol monobutyl ether, dipropylene glycol monobutyl ether, tripropylene glycol monobutyl ether, propylene glycol monopropyl ether, dipropylene glycol monopropylene ether, tripropylene glycol monomethyl ether and the like. These may be used alone, or two or more kinds of these may be used by being mixed with each other.

Among the glycol ethers described above, the alkyl group, which is included in the glycol ether, having a branched structure is more preferable. By containing the glycol ethers in which the alkyl group has a branched structure, it is possible to record a clear image with the less shade unevenness with respect to the recording surface which includes a polyolefin. Specific examples of the glycol ethers include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethyl pentyl ether, ethylene glycol mono-2-ethyl pentyl ether, ethylene glycol mono-2-methyl pentyl ether, diethylene glycol mono-2-methyl pentyl ether, and the like.

Among the branched structure of alkyl group which is included in the glycol ether, from the viewpoint of further increasing color-development property of the ink composition, 2-methylpentyl group, 2-ethylpentyl group, 2-ethylhexyl group are more preferable, and 2-ethylhexyl group is particularly preferable. Specifically, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methyl pentyl ether, diethylene glycol mono-2-methyl pentyl ether, and the like are exemplified. Ethylene glycol mono-2-ethylhexyl ether, diethylene glycol mono-2-ethylhexyl ether, triethylene glycol mono-2-ethylhexyl ether, and the like are particularly preferable.

Pyrrolidones

The pyrrolidones may be used from the viewpoint of increasing the fixity of the ink composition. As the pyrrolidones, N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like are exemplified.

pH Adjusting Agent

As the pH adjusting agent, for example, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, and the like are exemplified.

Preservative and Fungicide

As the preservative and the fungicide, for example, Sodium benzoate, pentachlorophenol sodium, 2-pyridinethiol-1-oxide sodium, sodium sorbate, sodium dehydroacetate, 1,2-dibenzisothiazolin-3-one are exemplified. As commercially available products, proxel XL2, proxel GXL (all are trade names, manufactured by Avecia Ltd.), Denisaido CSA, NS-500 W (all are trade names, manufactured by Nagase ChemteX Corporation) and the like are exemplified.

Anticorrosive Agent

As the anticorrosive agent, for example, benzotriazole and the like are exemplified.

Chelating Agent

As the chelating agent, for example, ethylene diamine tetraacetic acid and the salts thereof (disodium dihydrogen ethylenediamine tetraacetate salt, and the like), iminodisuccinic acid and the salts thereof and the like are exemplified.

3.2. Color Ink Composition

The color ink composition which is used in the ink jet recording method according to the embodiment contains at least one of the coloring material of the color system, the urethane-based resin, the acryl-based resin, and water.

3.2.1. Coloring Material of Color System

The coloring material of the color system means coloring materials other than the coloring material of the white color base described above, for example, a dye, a pigment, and the like are exemplified. The content of the coloring material is preferably 1% by mass to 20% by mass, and is more preferably 1% by mass to 15% by mass, with respect to the total mass of the color ink.

As the dye and the pigment described in the specifications of U.S. Patent Application Publication No. 2010/0086690, U.S. Patent Application Publication No. 2005/0235870, and International Publication No. WO 2011/027842 may be suitably used. Among the dye and the pigment, the pigment is further preferably included. The pigment, from the viewpoint of the preservation stability such as light resistance, weather resistance, and gas resistance and the like, is preferably organic pigments.

Specifically, as the pigment, azo pigments such as insoluble azo pigments, condensed azo pigments, azo lakes, and chelated azo pigments, polycyclic pigments such as phthalocyanine pigments, perylene and perinone pigments, anthraquinone pigments, quinacridone pigments, dioxane pigments, thioindigo pigments, isoindolinone pigments, quinophthalone pigments, dye chelates, dye lakes, nitro pigments, nitroso pigments, aniline black, daylight fluorescence pigments, carbon black, and the like are used. The above-pigments may be used alone, or two or more kinds thereof may be used by being mixed with each other.

In addition, as the dye, for example, various dyes which are used in normal ink jet recording, such as direct dyes, acid dyes, food dyes, basic dyes, reactive dyes, disperse dyes, vat dyes, soluble vat dyes, reactive disperse dyes may be used.

3.2.2. Resin

The color ink composition according to the embodiment preferably contains the resin. A preferable resin is at least any one of the urethane-based resin and the acryl-based resin. Since the adhesion to the urethane-based resin which is included in the white color-based ink composition described above is excellent, these resins may improve the fixity of the color image on the flexible packing film. In particular, when the urethane-based resin is contained in the color ink composition, the fixity of the color image may be further improved. Furthermore, it is preferable to use a resin which has Tg higher than that of the urethane resin of the white color-based ink composition in order to enhance the abrasion resistance of the color image as the urethane resin or the acrylic resin described above which is included in the color ink composition.

Urethane-based Resin

The same urethane-based resin as in the "3.1.2 Urethane-based resin" described above may be used as the urethane-based resin. Among the above-described urethane-based resin, the resin of which Tg is 10° C. to 120° C. is preferably used, and the resin of which Tg is 20° C. to 110° C. is more preferably used. When Tg of the urethane-based resin is in the above-range, particularly in not less than the lower limit, while imparting a moderate flexibility to coating of the color image, it is possible to improve the abrasion resistance of the color image. In addition, when Tg of the urethane-based resin is in the above-range, particularly in not more than the upper limit, since coating of the color image may be firm, while suppressing the embrittlement of the coating, it is possible to improve the peeling resistance of the color image.

The content of the urethane-based resin is preferably 0.1% by mass to 25% by mass, is more preferably 0.5% by mass to 20% by mass, and is particularly preferably 1% by mass to 15% by mass in terms of solid content, with respect to the total mass of the color ink composition. When the content of the urethane-based resin is in the above range, particularly, in not less than the lower limit, it is possible to further improve the abrasion resistance and the peeling resistance of the color image. Furthermore, when the content of the urethane-based resin is in the above-range, particularly is not more than the upper limit, there is a tendency that the preservation stability and the discharge stability of the color ink composition become excellent. Moreover, the urethane-based resin is preferably an emulsion type.

Acryl-based Resin

The acryl-based resin means a polymer obtained by using at least one among (meth)acrylic acid, (meth)acrylic acid ester, acrylonitrile, cyanoacrylate, acrylamide as a monomer (hereinafter, referred to as an "acryl-based monomer").

The acryl-based resin may be homopolymer of acryl-based monomer, and copolymer of monomer (for example, olefin, styrene, vinyl acetate, vinyl chloride, vinyl alcohol, vinyl ether, vinyl pyrrolidone, vinyl pyridine, vinyl carbazole, vinyl imidazole, vinylidene chloride, and the like) other than acryl-based monomer. In addition, the above-described copolymer may be any type among random copolymers, block copolymers, alternating copolymers, and graft copolymers. In the specification, "(meth)acrylic" means at least one among "acrylic" and "methacrylic" corresponding to that.

Among those described above, the acryl-based resin is preferably at least one of (meth)acryl-based resins and styrene-(meta)acrylic acid copolymer-based resins, more preferably at least one of acryl-based resins and styrene-acrylic acid copolymer-based resins, and even more preferably styrene-acrylic acid copolymer-based resins. Moreover, the acryl-based resin is more preferably an emulsion type.

As the resin emulsion described above, those obtained from a well-known material and by preparing method may be used, and commercially available products may be used. Examples of the commercially available products include Microgel E-1002, Microgel E-5002 (all are trade names, manufactured by Nippon Paint Co., Ltd.), Boncoat 4001, Boncoat 5454 (all are trade names, manufactured by DIC Corporation), SAE1014 (trade name, manufactured by Nippon Zeon Co., Ltd.), Saibinol SK-200 (trade name, manufactured by Saiden Chemical Co., Ltd.), JONCRYL 1992, 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, JONCRYL 7610 (all are trade names, manufactured by BASF Corporation) and the like. However the commercially available products are not limited to the above.

As the acryl-based resin, the resin of which Tg is 60° C. to 120° C. is preferably used, and the resin of which Tg is 70° C. to 110° C. is more preferably used. When Tg of the acryl-based resin is in the above-range, particularly in not less than the lower limit, while imparting a moderate flexibility to coating of the color image, it is possible to improve the abrasion resistance of the color image. In addition, when Tg of the acryl-based resin is in the above-range, particularly in not more than the upper limit, since coating of the color image may be firm, while suppressing the embrittlement of the coating, it is possible to improve the peeling resistance of the color image.

The content of the acryl-based resin is preferably 0.1% by mass to 25% by mass, is more preferably 0.5% by mass to 20% by mass, and is particularly preferably 1% by mass to 15% by mass in terms of solid content, with respect to the total mass of the color ink composition. When the content of the color-based resin is in the above range, particularly, in not less than the lower limit, it is possible to further improve the abrasion resistance and the peeling resistance of the color image. Furthermore, when the content of the acryl-based resin is in the above-range, particularly in not more than the upper limit, there is a tendency that the preservation stability and the discharge stability of the color ink composition become excellent.

3.2.3. Water

Water is a main medium of the color ink composition, and a component which is evaporated and scattered by drying. The color ink composition according to the embodiment is, so called, the water-based ink which includes water as a main solvent (water of 50% by mass or more is contained).

3.2.4. Other Components

The color ink composition may also contain components other than those described above. Since the components which may be used in the color ink composition are the same as the components in the above-described "3.1.4. Other components", description thereof will not be repeated.

3.3. Resin Ink Composition

The resin ink composition according to the embodiment contains the resin, substantially does not contain the coloring material. Since the resin ink according to the embodiment substantially does not contain the coloring material, it is a colorless transparent liquid or a colorless semitransparent liquid.

3.3.1. Resin

As the resin which is contained in the resin ink composition, for example, well-known resin such as polyolefin-based resins, rosin-modified resins, terpene-based resins, polyester-based resins, polyamide-based resins, epoxy-based resins, vinyl chloride-based resins, vinyl chloride-vinyl acetate copolymer, ethylene-vinyl acetate-based resins and the like, the urethane-based resins described above, and the acryl-based resin and the like described above may be used.

From the viewpoint of improving the abrasion resistance of the image which is recorded on the flexible packing film, the resin which is included in the resin ink composition is preferably a resin which has Tg higher than that of the urethane-based resin which is included in the white color-based ink composition described above.

The content of the resin in the resin ink composition is preferably 1% by mass to 30% by mass, and is more preferably 5% by mass to 25% by mass in terms of solid content, with respect to the total mass of the resin ink composition. When the content of a resin which is included in the resin ink composition is in the above range, since, while improving the drying property of the coating film, the image which is formed on the flexible packing film may be sufficiently coated, it is possible to improve the abrasion resistance and the peeling resistance of the image.

3.3.2. Other Components

The resin ink composition according to the embodiment, from the viewpoint of the reduction of environmental load and the like, preferably contains water as a main solvent.

Further, the resin ink composition according to the embodiment may contain components other than the above-described. Since the components which may be used in the resin ink composition are the same as the components in "3.1.4. Other Components" described above, description thereof will not be repeated.

3.4. Preparation Method of Ink Composition

Each ink composition (white color-based ink composition, color ink composition, and resin ink composition described above) according to the embodiment is obtained by mixing the components described above in arbitrary order, and by removing impurities through filtration or the like, as necessary. As a mixing method of each component, a method in which stirs and mixes after adding material sequentially in a vessel provided with a stirring device such as a mechanical stirrer, a magnetic stirrer, or the like may be suitably used. As a filtration method, a centrifugal filtration, a filter filtration or the like may be performed, as necessary.

3.5. Physical Property of Ink Composition

Each ink composition according to the embodiment, from the viewpoint of the balance between the image quality and the reliability as the ink composition for the ink jet, is preferably the ink composition of which the surface tension is 15 mN/m to 50 mN/m at 20° C., and is more preferably 20 mN/m to 40 mN/m. Moreover, the surface tension may be measured, for example, using an automatic tensiometer CBVP-Z (trade name, manufactured by Kyowa Interface Science Co., Ltd.) to confirm the surface tension when a platinum plate is wet with the ink composition in the environment of 20° C.

In addition, from the viewpoint of the same, the viscosity of each ink composition according to the embodiment at 20° C. is preferably 2 mPa·s to 15 mPa·s, and is more preferably 2 mPa·s to 10 mPa·s. Moreover, the viscosity may be measured by, for example, a viscoelasticity tester MCR-300 (trade name, manufactured by Pysica Inc.) in the environment of 20° C.

4. Flexible Packing Film

The ink jet recording method according to the embodiment is performed with respect to the flexible packing film.

The flexible packing film is film material having rich flexibility to be used food packing, toiletries packing, cosmetics packing, or the like and film material in which material having anti-fogging property and antistatic property, and antioxidant are present in the film surface, has a thickness in the range of 5 μm to 70 μm (preferably, 10 μm to 50 μm). When recording the ink composition on the film, compared with a normal plastic film, the ink is unlikely to be fixed, and even if fixed, since the ink does not correspond to the flexibility of the film, peeling-off is likely to occur.

As material having the antifogging property and the antistatic property, anionic surfactants, nonionic surfactants, cationic surfactants or vinyl-based polymers, acryl-based polymers are commonly used. As representative examples of surfactants, fatty acid esters such as glycerine fatty acid esters, polyglycerine fatty acid esters, and sorbitan fatty acid esters, fatty acid amides such as oleic acid amide and stearic acid amide, and surfactants (fat-soluble surfactant) of fatty acids or aliphatic derivatives such as ethylene oxide adducts thereof are exemplified. As representative examples of vinyl polymers, vinyl alcohol and vinyl chloride polymer are exemplified. As representative examples of acrylic polymer, acrylic polymer having ethylene oxide and polar groups (hydroxyl group, carboxyl group and the like) or the like is exemplified. As the patent publications, for example, a method for using glycerin mono-fatty acid esters and an organic phosphite in combination (JP-A-58-79042), a method for using anti-fogging agent and fluorine-containing compound thereof in combination (JP-A-3-215562), a method for using a hindered amine-based compound (JP-A-4-272946), a method for using aliphatic alcohol having 6 to 30 carbon atoms or aliphatic amine having 6 to 30 carbon atoms (JP-A-9-31242), and a method for using phosphoric acid-based compounds (JP-A-2008-115218) are exemplified.

As representative examples of the antioxidant, phenol-based antioxidants such as dibutyl, thioether-based antioxidants such as dilauryl thiopropionate, phosphoric acid ester-based antioxidants are exemplified. More specific examples include 3,5-di-t-butyl-4-hydroxybenzyl phosphonate-diethyl ester, N,N'-hexamethylene bis(3,5-di-t-butyl-4-hydroxy-hydrocinnamide), triethylene glycol-bis[3-(3-t-butyl-5-methyl-4-hydroxyphenyl)propionate], pentaerythrityl-tetrakis[3-(3,5-di-t-butyl-4-hydroxyphenyl) propionate], tetrakis [methylene-3(3',5'-di-t-butyl-4'-hydroxyphenyl)propionate) methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-t-butylphenyl)butyric acid]glycol ester, 1,3,5-tris(3',5'-di-t-butyl-4'-hydroxybenzyl)-s-triazine 2,4,6-(1H,3H,5H) trione, 1,6-hexanediol-bis[3-(3,5-di-t-butyl-4-hydroxyphenyl) propionate and the like.

Ester-based resins, amide-based resins, aramid-based resins, olefin-based resins, carbonate-based resins, styrene-based resins, acetal-based resins and the like may be used as the material which configures the recording surface of the flexible packing film. As a film substrate which includes the recording surface of the flexible packing film, the film substrate that the above resin is processed into a film or a sheet may be used. In a case of the film or the sheet which is obtained from the resin, any one of an unstretched film, or a stretched film which is stretched to a uniaxial direction or biaxial directions may be used, and the film or the sheet which is stretched to the biaxial directions may be preferably used. Furthermore, optionally, it may be also used in a stacked state in which the film and the sheets formed of these various polymers are bonded.

5. Experimental Examples

Hereinafter, the embodiment of the invention will be described in more detail with experimental examples, however, the embodiment of the invention is not limited to the experimental examples.

5.1. Preparation of Ink Composition 5.1.1. Preparation of Pigment Dispersion

In the white color-based ink composition which is used in the experimental examples, a water-insoluble pigment (white color-based) was used as a colorant. In addition, in the color ink composition which is used in the experimental examples, the water-insoluble pigments (black, cyan, magenta, and yellow) were used as a colorant. When the pigment is added to the ink composition, a resin dispersion pigment in which the pigment is dispersed by a resin dispersant in advance was used. Specifically, a pigment dispersion was prepared as follows.

Preparation of White Color-based Pigment Dispersion

First, acrylic acid-acrylic acid ester copolymer (mass average molecular mass: 25,000, acid value: 180) 4 parts by mass as the resin dispersant was added to ion-exchanged water 75 parts by mass in which 30% aqueous ammonia (neutralizer) 1 part by mass was dissolved, and was dissolved. Moreover, after adding 20 parts by mass of titanium oxide (C.I. pigment white color base 6) which is a white color-based pigment, distribution treatment was performed for 10 hours using a ball mill by zirconia beads. Thereafter, after removing impurities such as coarse particles and dust by performing a centrifugal filtration using a centrifuge, white color-based pigment concentration was adjusted to be 20% by mass. Particle diameter of the white-based pigment at that time was 350 nm in average particle diameter.

Preparation of Black Pigment Dispersion

First, acrylic acid-acrylic acid ester copolymer (mass average molecular mass: 25,000, acid value: 180) 7.5 parts by mass as the resin dispersant was added to ion-exchanged water 76 parts by mass in which 30% aqueous ammonia (neutralizer) 1.5 part by mass was dissolved, and was dissolved. Moreover, after adding 15 parts by mass of C.I. pigment black 7 as a black pigment, distribution treatment was performed for 10 hours using a ball mill by zirconia beads. Thereafter, after removing impurities such as coarse particles and dust by performing a centrifugal filtration using a centrifuge, black pigment concentration was adjusted to be 15% by mass. Particle diameter of the black pigment at that time was 80 nm in average particle diameter.

Preparation of Cyan Pigment Dispersion

In the same manner as the above-described "Preparation of Black Pigment Dispersion" other than using a cyan pigment (C.I. pigment blue 15:3) as a pigment, a cyan pigment dispersion was obtained. Particle diameter of the cyan pigment which is included in the cyan pigment dispersion was 100 nm in average particle diameter.

Preparation of Magenta Pigment Dispersion

In the same manner as the above-described "Preparation of black pigment dispersion" other than using a magenta pigment (C.I. pigment red 122) as a pigment, a magenta pigment dispersion was obtained. Particle diameter of the magenta pigment which is included in the magenta pigment dispersion was 100 nm in average particle diameter.

Preparation of Yellow Pigment Dispersion

In the same manner as the above-described "Preparation of Black Pigment Dispersion" other than using a yellow pigment (C.I. pigment yellow 155) as a pigment, a yellow pigment dispersion was obtained. Particle diameter of the yellow pigment which is included in the yellow pigment dispersion was 120 nm in average particle diameter.

5.1.2. Preparation of White Color-based Ink Composition and Color Ink Composition Using the pigment dispersion which is prepared in the above-described "Preparation of pigment dispersion", white color-based ink compositions W1 to W8 and color ink composition sets C1 to C3 in combination with black ink compositions 1 to 3, cyan ink compositions 1 to 3, magenta ink compositions 1 to 3, yellow ink compositions 1 to 3, as material compositions shown in Table 1, were obtained. Each ink composition was prepared by placing the materials shown in Table 1 in a vessel, stirring and mixing the materials for 2 hours using a magnetic stirrer, and filtering the mixture using a membrane filter having pore diameter of 5 μm to remove impurities such as dust and coarse particles. Moreover, all the values in Table 1 indicate % by mass, and ion-exchange water was added for the total mass of the ink composition to be 100% by mass.

5.1.3. Preparation of Resin Ink Composition

The resin ink compositions T1 to T4 having different material compositions were obtained as material compositions shown in Table 1. Each resin ink composition was prepared by placing the materials shown in Table 1 in a vessel, stirring and mixing the materials for 2 hours using a magnetic stirrer, and filtering the mixture using a membrane filter having pore diameter of 5 μm to remove impurities such as dust and coarse particles. Moreover, all the values in Table 1 indicate % by mass, and ion-exchange water was added for the total mass of the resin ink composition to be 100% by mass.

Moreover, in Table 1, materials described as other than compound name are as follows.

TAKELAC W-6061 (trade name, manufactured by Mitsui Chemicals, Inc., polyurethane resin emulsion, Tg: 25° C., 30% dispersion)

Superflex 130 (trade name, manufactured by Dai-ichi Kogyo Seiyaku Co., Ltd., polyurethane resin emulsion, Tg: 101° C., 35% dispersion)

Superflex 740 (trade name, manufactured by Dai-ichi Kogyo Seiyaku Co., Ltd., polyurethane resin emulsion, Tg: −34° C., 40% dispersion)

JONCRYL 1992 (trade name, manufactured by BASF Japan Ltd., styrene-acrylic acid copolymer emulsion, Tg: 78° C., 43% dispersion)

AQUACER 515 (trade name, manufactured by BYK Japan KK, polyethylene wax emulsion, melting point: 135° C., 35% dispersion)

BYK-348 (trade name, manufactured by BYK Japan KK, silicone-based surfactant)

Novec FC-4330 (trade name, manufactured by Sumitomo 3M Limited, fluorine-based surfactant)

Surfynol DF-110D (trade name, manufactured by Air Products and Chemicals Inc, acetylene glycol-based surfactant)

Emulgen 430 (trade name, manufactured by Kao Corporation, polyoxyethylene alkyl ether-based surfactant)

TABLE 1

| | White color-based ink composition | | | | | | | | Color ink composition set | | | Resin ink composition | | | |
|---|---|---|---|---|---|---|---|---|---|---|---|---|---|---|---|
| Material | W1 | W2 | W3 | W4 | W5 | W6 | W7 | W8 | C1 | C2 | C3 | T1 | T2 | T3 | T4 |
| White: pigment dispersion (pigment content: 20% by mass) | 50 | 50 | 50 | 50 | 50 | 50 | 50 | 50 | — | — | — | — | — | — | — |
| Color: pigment dispersion (pigment content: 15% by mass) | — | — | — | — | — | — | — | — | 26.67 | 26.67 | 26.67 | — | — | — | — |
| TAKELAC W-6061 (polyurethane resin emulsion) Tg: 25° C. <30% dispersion> | 13.33 | — | — | 13.33 | — | 13.33 | 13.33 | 13.33 | 3.33 | — | — | 16.67 | 3.33 | 3.33 | — |
| Superflex 130 (polyurethane resin emulsion) Tg: 101° C. <35% dispersion> | — | 11.43 | — | — | — | — | — | — | — | — | — | — | 11.43 | — | — |
| Superflex 740 (polyurethane resin emulsion) Tg: −34° C. <40% dispersion> | — | — | 10 | — | — | — | — | — | — | — | — | — | — | — | — |
| JONCRYL 1992 (styrene-acrylic acid copolymer emulsion) Tg: 78° C. <43% dispersion> | — | — | — | — | 11.63 | — | — | — | — | 2.33 | 2.33 | — | — | 9.3 | 11.63 |
| AQUACER515 (polyethylene wax emulsion) Tg: 135° C. <35% dispersion> | 2.86 | 2.86 | 2.86 | 2.86 | 2.86 | 2.86 | 2.86 | 2.86 | 1.43 | 1.43 | 2.86 | 5.71 | 5.71 | 5.71 | 5.71 |
| 1,2-hexanediol (water-soluble organic solvent) bp: 224° C. | 2 | 2 | 2 | 2 | 3 | 2 | 2 | 2 | 4 | 4 | 6 | 2 | 2 | 2 | 5 |
| Propylene glycol (water-soluble organic solvent) bp: 189° C. | 15 | 15 | 15 | 12 | 15 | 15 | 15 | 15 | 15 | 15 | 7 | 20 | 20 | 20 | 12 |
| 2-pyrolidone (water-soluble organic solvent) bp: 245° C. | — | — | — | 3 | — | — | — | — | — | 3 | 20 | — | — | — | 4 |
| BYK-348 (silicone-based surfactant) | 0.5 | 0.5 | 0.5 | 0.5 | — | 0.5 | 0.5 | 0.5 | 0.5 | 0.5 | 0.5 | 0.5 | 0.5 | 0.5 | 0.5 |
| Novec FC-4330 (fluorine-based surfactant) | — | — | — | — | 0.5 | — | — | — | — | — | — | — | — | — | — |
| SURFYNOL DF110D (acetylene glycol based surfactant) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Emulsion 430 (polyoxyethylene alkyl ether-based surfactant) | | | | | | 0.5 | 1 | 2 | | | | | | | |
| Triethanolamine (pH adjusting agent) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Ethylene diamine tetraacetic acid (chelating agent) | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Benzotriazole (anticorrosive agent) | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| Ion-exchanged water | Balance | Balance | Balance | Balance | Balance | Balance | Balance | Balance | Balance | Balance | Balance | Balance | Balance | Balance | Balance |
| Total (mass %) | 100 | 100 | 100 | 100 | 100 | 100 | 100 | 100 | 100 | 100 | 100 | 100 | 100 | 100 | 100 |

5.2. Evaluation of Recorded Material 5.2.1. Tape Peeling Evaluation of Recorded Material A biaxially stretching polypropylene film (trade name: Pylene film OT, model number: P2111, thickness: 20 μm, manufactured by Toyobo Co., Ltd.), and a nylon film bag (trade name: Kyobizin, model number: X-2030, film thickness: 80 μm, manufactured by Kurilon Chemical Co., Ltd.) were used as a recording medium (flexible packing film).

In addition, as a printer of the ink jet recording method, an ink jet printer PX-G930 (trade name, manufactured by Seiko Epson Corporation, nozzle resolution: 180 dpi) attached with a heater capable of varying the temperature in a paper guide section was used.

The white color-based ink compositions W1 to W5, the color ink composition sets C1 to C3, and the resin ink compositions T1 to T4 were suitably filled in the ink jet printer PX-G930. Recording was performed on the recording medium. As a recording pattern, in resolution of horizontal resolution 720 dpi and vertical resolution 720 dpi, an image was prepared to be capable of recording fill patterns which form a full-color image on the white-based image, and fill patterns in which the full color image on the white color-based image was coated with a coating film, by 100% duty of each color, and it was used.

Furthermore, the following conditions were combined and performed as the recording condition. Even when recording any image of a white color-based image, the color image, and the coating film, the heater setting of the printer paper guide section at the time of printing is set to "setting the temperature of the recording surface to be 40° C.", the wind at temperature of 40° C. with respect to recorded material in recording was blown by adjusting the wind speed at the surface of the recording medium to become about 2 m/sec to 5 m/sec (corresponding to the white color-based image heating step, the color image heating step, and the coating film heating step). Moreover, in the white color-based image heating step, the color image heating step, and the coating film heating step, the drying treatment was performed by setting drying time (heating and blowing) to two minutes. Then, with respect to the recorded material immediately after recording, that is, the recorded material in which all recording of image was finished, drying treatment was performed (corresponding to the entire heating step) by blowing the wind at temperature of 40° C. or 80° C. for 10 minutes of which the wind speed at the surface of the recording medium was adjusted to become about 6 m/sec to 10 m/sec. Moreover, the heating temperature described in Table 2 and 3 is the temperature of a step which corresponds to the entire heating step.

Furthermore, the hydrophilic treatment with respect to a recording medium was performed using an internally produced corona discharge treatment machine under the condition of input electrode: 90 W, electrode width: 0.2 m, irradiating speed: 1 m/min (that is, amount of corona discharge: 450 W·min/$m^2$).

Then, a transparent adhesive tape (trade name: transparent beauty color, manufactured by Sumitomo 3M Limited) was attached on the recording surface of the recorded material which was allowed to stand for 5 hours in laboratory of 20° C. to 25° C./40% RH to 60% RH environment, the tape was peeled off by hand, and by confirming the ink peeling of the recording surface and ink transfer states to the tape, a tape peelability (peeling resistance) was evaluated. Evaluation criteria for the tape peelability are as follows. In addition, the results are shown in Table 2.

A: Ink peeling and ink transfer to tape of recording surface were not observed.

B: Ink peeling of the recording surface was not observed, however, ink transfer to the tape was observed slightly.

C: Ink of the recording surface was partly peeled off.

D: All of the ink of the recording surface was peeled off.

TABLE 2

| | | Ink set White color-based ink composition | | | | | | | | | | | | | | |
|---|---|---|---|---|---|---|---|---|---|---|---|---|---|---|---|---|
| | | W1 | | | W2 | | | W3 | | | W4 | | | W5 | | |
| | | Color ink composition set | | | | | | | | | | | | | | |
| | | C1 | C2 | C3 | C1 | C2 | C3 | C1 | C2 | C3 | C1 | C2 | C3 | C1 | C2 | C3 |
| | Resin ink composition | — | — | — | — | — | — | — | — | — | — | — | — | — | — | — |
| Recording medium: PP | (1) Non corona treatment/drying at 40° C.) | B | C | D | C | D | D | B | C | D | B | C | D | D | D | D |
| | (2) Non corona treatment/drying at 80° C.) | A | B | C | B | C | C | A | B | C | B | B | C | C | D | D |
| | (3) Corona treatment/drying at 40° C.) | A | B | C | B | C | C | A | B | C | B | C | D | D | D | D |
| | (4) Corona treatment/drying at 80° C.) | A | B | B | B | B | C | A | B | B | A | B | C | C | C | D |
| | Resin ink composition | T1 | T1 | T1 | T1 | T1 | T1 | T1 | T1 | T1 | T1 | T1 | T1 | T1 | T1 | T1 |
| Recording medium: PP | (1) Non corona treatment/drying at 40° C.) | A | B | C | B | C | C | A | B | C | B | B | C | C | C | C |
| | (2) Non corona treatment/drying at 80° C.) | A | A | B | A | B | B | A | A | B | A | A | B | C | C | C |
| | (3) Corona treatment/drying at 40° C.) | A | B | B | A | B | B | A | B | B | A | B | C | C | C | C |
| | (4) Corona treatment/drying at 80° C.) | A | A | A | A | A | B | A | A | A | A | A | B | C | C | C |

| | | Ink set White color-based ink composition | | | | | | | | | | | | | | | | | |
|---|---|---|---|---|---|---|---|---|---|---|---|---|---|---|---|---|---|---|---|
| | | W1 | | W2 | | W3 | | W1 | | W2 | | W3 | | W1 | | W2 | | W3 | |
| | | Color ink composition set | | | | | | | | | | | | | | | | | |
| | | C1 | C2 | C1 | C2 | C1 | C2 | C1 | C2 | C1 | C2 | C1 | C2 | C1 | C2 | C1 | C2 | C1 | C2 |
| | Resin ink composition | T2 | T2 | T2 | T2 | T2 | T2 | T3 | T3 | T3 | T3 | T3 | T3 | T4 | T4 | T4 | T4 | T4 | T4 |
| Recording medium: PP | (3) Corona treatment/drying at 40° C.) | A | B | A | B | A | B | A | B | A | B | A | B | B | B | B | C | B | B |
| | (4) Corona treatment/drying at 80° C.) | A | A | A | A | A | A | A | A | A | A | A | A | A | A | A | A | A | A |

TABLE 2-continued

| | | Ink set White color-based ink composition | | | | | | | | | | | | | | |
|---|---|---|---|---|---|---|---|---|---|---|---|---|---|---|---|---|
| | | W1 | | | W2 | | | W3 | | | W4 | | | W5 | | |
| | | Color ink composition set | | | | | | | | | | | | | | |
| | | C1 | C2 | C3 | C1 | C2 | C3 | C1 | C2 | C3 | C1 | C2 | C3 | C1 | C2 | C3 |
| | Resin ink composition | — | — | — | — | — | — | — | — | — | — | — | — | — | — | — |
| Recording medium: NY | (1) Non corona treatment/drying at 40° C.) | B | C | D | C | D | D | B | C | D | B | C | D | D | D | D |
| | (2) Non corona treatment/drying at 80° C.) | A | B | C | B | C | C | A | B | C | B | B | C | C | D | D |
| | (3) Corona treatment/drying at 40° C.) | A | B | C | B | C | C | A | B | C | B | C | D | D | D | D |
| | (4) Corona treatment/drying at 80° C.) | A | B | B | B | B | C | A | B | B | A | B | C | C | C | D |
| | Resin ink composition | T1 | T1 | T1 | T1 | T1 | T1 | T1 | T1 | T1 | T1 | T1 | T1 | T1 | T1 | T1 |
| Recording medium: NY | (1) Non corona treatment/drying at 40° C.) | A | B | C | B | C | C | A | B | C | B | B | C | C | C | C |
| | (2) Non corona treatment/drying at 80° C.) | A | A | B | A | B | B | A | A | B | A | A | B | C | C | C |
| | (3) Corona treatment/drying at 40° C.) | A | B | B | A | B | B | A | B | B | A | B | C | C | C | C |
| | (4) Corona treatment/drying at 80° C.) | A | A | A | A | A | B | A | A | A | A | A | B | C | C | C |

| | | Ink set White color-based ink composition | | | | | | | | | | | | | | | | | |
|---|---|---|---|---|---|---|---|---|---|---|---|---|---|---|---|---|---|---|---|
| | | W1 | | W2 | | W3 | | W1 | | W2 | | W3 | | W1 | | W2 | | W3 | |
| | | Color ink composition set | | | | | | | | | | | | | | | | | |
| | | C1 | C2 | C1 | C2 | C1 | C2 | C1 | C2 | C1 | C2 | C1 | C2 | C1 | C2 | C1 | C2 | C1 | C2 |
| | Resin ink composition | T2 | T2 | T2 | T2 | T2 | T2 | T3 | T3 | T3 | T3 | T3 | T3 | T4 | T4 | T4 | T4 | T4 | T4 |
| Recording medium: NY | (3) Corona treatment/drying at 40° C.) | A | B | A | B | A | B | A | B | A | B | A | B | B | B | B | C | B | B |
| | (4) Corona treatment/drying at 80° C.) | A | A | A | A | A | A | A | A | A | A | A | A | A | A | B | B | A | A |

5.2.2. Abrasion Resistance Evaluation of Recorded Material

A recorded material used in evaluation of the abrasion resistance was prepared in the same manner as the above-described "5.2.1. Tape Peeling Evaluation of Recorded Material".

Then, after allowing the obtained recorded material to stand for 5 hours in laboratory of 20° C. to 25° C./40% RH to 60% RH environment, by confirming the ink peeling state of the recording surface and ink transfer state to cotton cloth when the recorded material was rubbed 20 times by the cotton cloth under load 200 g, using Gakushin-type fastness-to-friction tester AB-301 (trade name, manufactured by TESTER SANGYO CO., LTD.), the abrasion resistance was evaluated. Evaluation criteria for abrasion resistance are as follows. In addition, the results are shown in Table 3.

A: Even after rubbing 20 times, ink peeling and ink transfer to the cotton cloth were not observed.

B: After rubbing 20 times, ink peeling of recording surface was partly observed or ink transfer to the cotton cloth was observed slightly.

C: After rubbing 20 times, ink peeling of recording surface or ink transfer to the cotton cloth was observed.

D: Before finishing rubbing 20 times, ink peeling of recording surface or ink transfer to the cotton cloth was observed.

TABLE 3

| | | Ink set White color-based ink composition | | | | | | | | | | | | | | |
|---|---|---|---|---|---|---|---|---|---|---|---|---|---|---|---|---|
| | | W1 | | | W2 | | | W3 | | | W4 | | | W5 | | |
| | | Color ink composition set | | | | | | | | | | | | | | |
| | | C1 | C2 | C3 | C1 | C2 | C3 | C1 | C2 | C3 | C1 | C2 | C3 | C1 | C2 | C3 |
| | Resin ink composition | — | — | — | — | — | — | — | — | — | — | — | — | — | — | — |
| Recording medium: PP | (1) Non corona treatment/drying at 40° C.) | B | C | D | B | C | D | C | D | D | B | C | D | D | D | D |
| | (2) Non corona treatment/drying at 80° C.) | A | B | C | A | B | C | B | C | C | B | B | C | C | D | D |
| | (3) Corona treatment/drying at 40° C.) | A | B | C | A | B | C | B | C | C | B | C | D | D | D | D |
| | (4) Corona treatment/drying at 80° C.) | A | B | B | A | B | B | B | B | C | A | B | C | C | C | D |
| | Resin ink composition | T1 | T1 | T1 | T1 | T1 | T1 | T1 | T1 | T1 | T1 | T1 | T1 | T1 | T1 | T1 |
| Recording medium: PP | (1) Non corona treatment/drying at 40° C.) | A | B | C | A | B | C | B | C | C | B | B | C | C | C | C |
| | (2) Non corona treatment/drying at 80° C.) | A | A | B | A | A | B | A | B | B | A | A | B | C | C | C |
| | (3) Corona treatment/drying at 40° C.) | A | B | B | A | B | B | A | B | B | A | B | C | C | C | C |
| | (4) Corona treatment/drying at 80° C.) | A | A | A | A | A | A | A | A | B | A | A | B | C | C | C |

TABLE 3-continued

| | | Ink set White color-based ink composition | | | | | | | | | | | | | | | | | |
|---|---|---|---|---|---|---|---|---|---|---|---|---|---|---|---|---|---|---|---|
| | | W1 | | W2 | | W3 | | W1 | | W2 | | W3 | | W1 | | W2 | | W3 | |
| | | Color ink composition set | | | | | | | | | | | | | | | | | |
| | | C1 | C2 | C1 | C2 | C1 | C2 | C1 | C2 | C1 | C2 | C1 | C2 | C1 | C2 | C1 | C2 | C1 | C2 |
| | Resin ink composition | T2 | T2 | T2 | T2 | T2 | T2 | T3 | T3 | T3 | T3 | T3 | T3 | T4 | T4 | T4 | T4 | T4 | T4 |
| Recording medium: PP | (3) Corona treatment/drying at 40° C.) | A | B | A | B | A | B | A | B | A | B | A | B | B | B | B | B | B | C |
| | (4) Corona treatment/drying at 80° C.) | A | A | A | A | A | A | A | A | A | A | A | A | A | A | A | A | B | B |

| | | Ink set White color-based ink composition | | | | | | | | | | | | | | |
|---|---|---|---|---|---|---|---|---|---|---|---|---|---|---|---|---|
| | | W1 | | | W2 | | | W3 | | | W4 | | | W5 | | |
| | | Color ink composition set | | | | | | | | | | | | | | |
| | | C1 | C2 | C3 | C1 | C2 | C3 | C1 | C2 | C3 | C1 | C2 | C3 | C1 | C2 | C3 |
| | Resin ink composition | — | — | — | — | — | — | — | — | — | — | — | — | — | — | — |
| Recording medium: NY | (1) Non corona treatment/drying at 40° C.) | B | C | D | B | C | D | C | D | D | B | C | D | D | D | D |
| | (2) Non corona treatment/drying at 80° C.) | A | B | C | A | B | C | B | C | C | B | B | C | C | D | D |
| | (3) Corona treatment/drying at 40° C.) | A | B | C | A | B | C | B | C | C | B | C | D | D | D | D |
| | (4) Corona treatment/drying at 80° C.) | A | B | B | A | B | B | B | B | C | A | B | C | C | C | D |
| | Resin ink composition | T1 | T1 | T1 | T1 | T1 | T1 | T1 | T1 | T1 | T1 | T1 | T1 | T1 | T1 | T1 |
| Recording medium: NY | (1) Non corona treatment/drying at 40° C.) | A | B | C | A | B | C | B | C | C | B | B | C | C | C | C |
| | (2) Non corona treatment/drying at 80° C.) | A | A | B | A | A | B | A | B | B | A | A | B | C | C | C |
| | (3) Corona treatment/drying at 40° C.) | A | B | B | A | B | B | A | B | B | A | B | C | C | C | C |
| | (4) Corona treatment/drying at 80° C.) | A | A | A | A | A | A | A | A | B | A | A | B | C | C | C |

| | | Ink set White color-based ink composition | | | | | | | | | | | | | | | | | |
|---|---|---|---|---|---|---|---|---|---|---|---|---|---|---|---|---|---|---|---|
| | | W1 | | W2 | | W3 | | W1 | | W2 | | W3 | | W1 | | W2 | | W3 | |
| | | Color ink composition set | | | | | | | | | | | | | | | | | |
| | | C1 | C2 | C1 | C2 | C1 | C2 | C1 | C2 | C1 | C2 | C1 | C2 | C1 | C2 | C1 | C2 | C1 | C2 |
| | Resin ink composition | T2 | T2 | T2 | T2 | T2 | T2 | T3 | T3 | T3 | T3 | T3 | T3 | T4 | T4 | T4 | T4 | T4 | T4 |
| Recording medium: NY | (3) Corona treatment/drying at 40° C.) | A | B | A | B | A | B | A | B | A | B | A | B | B | B | B | B | B | C |
| | (4) Corona treatment/drying at 80° C.) | A | A | A | A | A | A | A | A | A | A | A | A | A | A | A | A | B | B |

5.2.3. Water-friction Resistance Evaluation of Recorded Material

A recorded material for water-friction resistance evaluation was prepared using the same recording medium and the printer used in the above-described "5.2.1. Tape Peeling Evaluation of Recorded Material".

Specifically, the white color-based ink compositions W1, W6 to W8 were filled in the ink jet printer PX-G930, and then recording was performed onto the recording medium. As the recording pattern, in resolution of horizontal resolution 720 dpi and vertical resolution 720 dpi, an image of fill pattern of 100% duty was prepared, and it was used.

Furthermore, the recording condition was used in combination with the condition exemplified in the above-described "5.2.1. Tape Peeling Assessment of Recorded Material".

After allowing the obtained recorded material to stand for 5 hours in laboratory of 20° C. to 25° C./40% RH to 60% RH environment, the recorded material was wiped out 5 times by BEMCOT (trade name: BEMCOT M-1, manufactured by Asahi Kasei Fibers Corporation) in which the recording surface of the recorded material was immersed in water, the ink state of image region and ink transfer state to BEMCOT was observed after the wiping off to evaluate the water-friction resistance of the recorded material. Evaluation criteria are as follows. In addition, the evaluation results are shown in Table 4.

A: The change in the appearance of the image area was not observed, and ink adhesion to BEMCOT was not observed.

B: Slight irregularity in the image area was observed, but ink adhesion to BEMCOT was not observed.

C: Apparent irregularity in the image area was observed, and ink adhesion to BEMCOT was observed.

5.3. Discharge Stability Evaluation of White Color-based Ink Composition

The white color-based ink compositions W1, W6 to W8 described in Table 1, were filled into the printer head of the ink jet printer PX-G930 (trade name, manufactured by Seiko Epson Corporation, nozzle resolution: 180 dpi) in which the heater capable of varying temperature in paper guide section was attached. After confirming that there are no defective filling and nozzle clogging by printing a nozzle check pattern after filling, heater setting of the printer guide section was changed, a printing pattern was made such that the ink discharge which discharges the ink at regular intervals may be stopped to perform the printing operation using it. Thereafter, by printing the nozzle check pattern again, observing the ink discharging state, and checking time intervals of flying bend and discharging omission, the discharge stability of the ink jet head of the white color-based ink composition was evaluated. The heater settings of the printer paper guide section at the time of printing were set to be three types of "setting the temperature of the recording surface to be 40° C.", "setting the temperature of the recording surface to be 60° C.", and "setting the temperature of the recording surface to be 80° C." In addition, time interval of the presence or the absence of discharge was set to be the maximum 120 seconds. The evaluation criteria are shown below. In addition, the evaluation results are shown in Table 4.

A: Even to time interval of the presence or the absence of discharge of 120 seconds, nozzles of flying bend and discharge omission were not generated at all.

B: To time interval of the presence or the absence of discharge is to 60 seconds, nozzles of flying bend and discharge omission were not generated at all.

C: To time interval of the presence or the absence of discharge is to 30 seconds, nozzles of flying bend and discharge omission were not generated at all.

D: When time interval of the presence or the absence of discharge is 30 seconds or less, nozzles of flying bend and discharge omission was generated.

TABLE 4

| | White color-based ink composition | | | | | | | |
|---|---|---|---|---|---|---|---|---|
| | W1 | W6 | W7 | W8 | W1 | W6 | W7 | W8 |
| Recording medium | PP | PP | PP | PP | NY | NY | NY | NY |
| Water-friction resistance | A | A | B | C | A | A | B | C |
| Discharge stability (recording surface temperature: 40° C.) | B | A | A | A | — | — | — | — |
| Discharge stability (recording surface temperature: 60° C.) | C | B | A | A | — | — | — | — |
| Discharge stability (recording surface temperature: 80° C.) | D | C | B | A | — | — | — | — |

5.4. Evaluation Results

The evaluation results are described in Tables 2 to 4. Among Tables 2 to 4, the recording medium PP indicates the above-described biaxial stretching polypropylene film, and a recording medium NY indicates nylon film bag.

As the evaluation results in Tables 2 and 3, since the white color-based ink composition W5 does not contain the urethan resin, a tendency in which the tape peelability (peeling resistance) and the abrasion resistance decrease was observed.

Moreover, the evaluation result of Table 4 shows that when polyoxy ethylene alkyl ether-based surfactant is included in the white color-based ink composition, even when the recording medium is dried at high temperature, clogging of the nozzles is less, and the discharging stability of the ink is excellent.

The invention is not limited to the above-described embodiment, and various modifications may be made. For example, the invention includes the substantially same configuration as the configurations described in the embodiment (for example, a configuration in which function, methods and results are the same, or a configuration in which an object and an effect are the same). In addition, the invention includes configurations in which non-essential portion of the configurations described in the embodiment is replaced. In addition, the invention includes a configuration which may play the same effect or can achieve the same object as the configurations described in the embodiment. In addition, the invention includes a configuration in which a well-known technique in the related art is added to the configurations described in the embodiment.

What is claimed is:

1. An ink jet recording method comprising:

recording a white color-based image by discharging droplets of a white color-based ink composition from nozzles of an ink jet recording head, and then attaching the droplets of the white color-based ink composition on a recording surface of a flexible packing film;

recording a color image by discharging droplets of a color ink composition from the nozzles, and then attaching the droplets of the color ink composition on the white color-based image; and firstly heating at least the white color-based image and the color image at temperature higher than 40° C., wherein the white color-based ink composition contains water, a coloring material of a white color base, and a urethane-based resin, but substantially does not contain alkyl polyols having a normal boiling point of 280° C. or more, and wherein the color ink composition contains water, and a coloring material of a color system.

2. The ink jet recording method according to claim 1, wherein the color ink composition includes at least any one of a urethane-based resin and an acryl-based resin.

3. The ink jet recording method according to claim 1, further comprising:

coating the color image with a coating film formed of a resin ink composition; and secondly heating the coating film at temperature equal to or higher than 40° C. before the firstly heating, wherein the firstly heating is performed after the secondly heating, and heats the white color-based image, the color image, and the coating film at temperature higher than 40° C., wherein the resin ink composition contains a resin, but substantially does not contain the coloring material, and wherein the glass-transition temperature of the resin which is included in the resin ink composition is higher than the glass-transition temperature of a urethane-based resin which is included in the white color-based ink composition.

4. The ink jet recording method according to claim 1, wherein the glass-transition temperature of the urethane-based resin which is included in the white color-based ink composition is 10° C. to 70° C.

5. The ink jet recording method according to claim 4, wherein the white color-based ink composition further contains a wax, and wherein the melting point of the wax which is included in the white color-based ink composition is higher than the heating temperature in the firstly heating.

6. The ink jet recording method according to claim 1, wherein, in a case where the mass right after recording of the white color-based image is set to 100%, and the mass at the time when drying of the white color-based image ends is set to 0%, the recording of the color image is performed when the mass is in the range of 30% to 80% by drying of the white color-based image.

7. The ink jet recording method according to claim 1, wherein the white color-based ink composition contains a polyoxy ethylene alkyl ether-based surfactant.

8. The ink jet recording method according to claim 1, further comprising:

before the recording of the color image, thirdly heating the white color-based image in the range of 40° C. to 80° C. is further included, wherein the heating temperature in the firstly heating is higher than heating temperature in thirdly heating, and wherein heating time in the firstly heating is longer than heating time in the thirdly heating.

9. The ink jet recording method according to claim 1, wherein a film thickness of the flexible packing film is in the range of 5 μm to 70 μm.

10. The ink jet recording method according to claim 1, wherein at least one of an anti-fogging agent and an anti-static agent is present on the recording surface of the flexible packing film.

* * * * *